(12) United States Patent
Stenfeldt et al.

(10) Patent No.: US 10,337,381 B2
(45) Date of Patent: Jul. 2, 2019

(54) EXHAUST GAS AFTERTREATMENT DEVICE FOR AN INTERNAL COMBUSTION ENGINE

(71) Applicant: Volvo Car Corporation, Gothenburg (SE)

(72) Inventors: Marie Stenfeldt, Gothenburg (SE); Peter Sandberg, Gothenburg (SE); Rakshith Ramachandra, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 118 days.

(21) Appl. No.: 15/460,715

(22) Filed: Mar. 16, 2017

(65) Prior Publication Data

US 2017/0276050 A1 Sep. 28, 2017

(30) Foreign Application Priority Data

Mar. 23, 2016 (EP) ..................... 16161989

(51) Int. Cl.
*F01N 3/28* (2006.01)
*F01N 3/20* (2006.01)
*F01N 3/08* (2006.01)

(52) U.S. Cl.
CPC ......... *F01N 3/2896* (2013.01); *F01N 3/0807* (2013.01); *F01N 3/206* (2013.01); *F01N 3/2892* (2013.01); *F01N 3/2066* (2013.01); *F01N 2240/16* (2013.01); *F01N 2240/18* (2013.01); *F01N 2240/20* (2013.01); *F01N 2530/24* (2013.01); *F01N 2610/01* (2013.01); *F01N 2610/02* (2013.01); *F01N 2610/03* (2013.01);

(Continued)

(58) Field of Classification Search
CPC ...... F01N 3/0807; F01N 3/206; F01N 3/2066; F01N 3/2892; F01N 3/2896; F01N 2240/16; F01N 2240/18; F01N 2240/20; F01N 2530/24; F01N 2610/01; F01N 2610/02; F01N 2610/03; F01N 2610/102; Y02A 50/2325; Y02T 10/20
USPC .......................................... 60/324
See application file for complete search history.

(56) References Cited

U.S. PATENT DOCUMENTS

2003/0070424 A1  4/2003  Verdegan et al.
2007/0036694 A1  2/2007  Nishioka et al.
(Continued)

FOREIGN PATENT DOCUMENTS

EP    1890016 A2   2/2008
EP    2960454 A1   12/2015
(Continued)

*Primary Examiner* — Audrey K Bradley
(74) *Attorney, Agent, or Firm* — Snyder, Clark, Lesch & Chung, LLP

(57) ABSTRACT

The invention relates to an exhaust gas aftertreatment device for an internal combustion engine, where the device comprises: an exhaust duct allowing a through-flow of exhaust gas; a catalytic NOx converter arranged in the exhaust duct; and a fluid inlet arranged to introduce a liquid reductant into or onto a structure in the exhaust duct upstream the catalytic NOx converter. The invention is characterized in that the structure is a sorption structure having pores configured to retain the liquid reductant in liquid form until it evaporates. The invention also relates to a vehicle provided with such a device.

12 Claims, 3 Drawing Sheets

(52) U.S. Cl.
CPC ..... *F01N 2610/102* (2013.01); *Y02A 50/2325* (2018.01); *Y02T 10/20* (2013.01)

(56) References Cited

U.S. PATENT DOCUMENTS

| | | | | |
|---|---|---|---|---|
| 2010/0083643 | A1* | 4/2010 | Hayashi | B01D 53/90 60/297 |
| 2011/0047974 | A1 | 3/2011 | Henry et al. | |
| 2013/0052095 | A1* | 2/2013 | Omote | F01N 3/2066 422/170 |
| 2013/0118157 | A1* | 5/2013 | Kruse | F01N 3/2066 60/295 |
| 2014/0102082 | A1* | 4/2014 | Tobben | F01N 3/2066 60/295 |

FOREIGN PATENT DOCUMENTS

| | | | | |
|---|---|---|---|---|
| WO | 2004079171 | A1 | 9/2004 | |
| WO | WO-2009127449 | A1* | 10/2009 | ............ B01F 3/022 |

\* cited by examiner

EXHAUST GAS AFTERTREATMENT DEVICE FOR AN INTERNAL COMBUSTION ENGINE

RELATED APPLICATION

This application claims priority under 35 U.S.C. § 119 based on European Patent Application No. 16161989.5, filed Mar. 23, 2016, the disclosure of which is hereby incorporated by reference herein.

TECHNICAL FIELD

The present disclosure relates to an exhaust gas aftertreatment device for an internal combustion engine. In particular the disclosure relates to introduction of reductant for catalytic NOx conversion.

BACKGROUND

To fulfil current emission legislations, most vehicles with internal combustion engines are today provided with an exhaust gas aftertreatment device comprising a catalytic converter arranged in an exhaust duct for reduction of exhaust gas emissions. The catalytic converter generally consists of a tubular, longitudinal body with an inlet and an outlet, where the inlet is in fluid communication with the outlet. The catalytic converter usually comprises at least one catalytic converter substrate in a channelled structure arranged between the inlet and outlet. Exhaust gases can pass through the channelled structure while being exposed to a large surface area of the catalytic converter. The inlet of the catalytic converter receives exhaust gas emissions from the internal combustion engine and the outlet is arranged for discharging exhaust gas emissions treated in the catalytic converter.

The most frequently used catalytic converter structure for petrol engines is generally Three Way Catalyst (TWC). For diesel engines generally Diesel Oxidation Catalyst (DOC) and Lean NOx Trap (LNT) are most frequently used. It is also common that the above mentioned catalytic converter structures are supplemented by a catalytic nitrogen oxide (NOx) converter, such as a substrate with selective catalytic reduction (SCR) functionality for improved NOx reduction. For substrates with SCR functionality, a liquid or gaseous reductant is introduced in the gas emission flow upstream the SCR substrate so that the reductant can mix with the exhaust gas emissions before the SCR substrate.

When using liquid reductant, such as a urea solution ("AdBlue"), the liquid reductant is sprayed into the exhaust duct upstream the catalytic NOx converter so that the liquid reductant can evaporate and mix with the exhaust gases before entering the catalytic NOx converter. Heat transferred from the exhaust gases is used for evaporating the liquid reductant. Sufficient mixture of the reductant is important for optimal reduction of NOx in the SCR substrate and for the SCR substrate to work properly.

US2007/0036694 discloses an example of an exhaust aftertreatment system where an injector is injecting a liquid reductant in the form of urea water into an exhaust duct and where a NOx catalyst is disposed downstream the injector. The liquid reductant is in this example injected onto inclined perforated plates arranged in the exhaust duct so that droplets of the injected liquid reductant impinge against the plates before reaching a wall surface of the exhaust duct. According to US2007/0036694, deposition of the liquid reductant on the wall surface is prevented and the liquid reductant is uniformly dispersed into the exhaust gas.

Conventional SCR exhaust gas aftertreatment systems commonly work well during normal operation conditions when the exhaust gas temperature is relatively high. However, a disadvantage of conventional SCR exhaust gas aftertreatment systems is that the liquid reductant is not evaporated sufficiently at lower temperature levels, i.e. typically in low-load situations. This might lead to wetting of the walls in the exhaust duct and reduction deposit formation on the walls and other components of the exhaust duct.

There is thus a need for an improved SCR exhaust gas aftertreatment device adapted to low temperature conditions.

SUMMARY OF THE INVENTION

An object of the present disclosure is to provide an SCR exhaust gas aftertreatment device for an internal combustion engine, where the evaporation of liquid reductant is efficient also at lower exhaust gas temperatures.

The invention relates to an exhaust gas aftertreatment device for an internal combustion engine, where the device comprises an exhaust duct allowing a through-flow of exhaust gas, a catalytic NOx converter arranged in the exhaust duct, and a fluid inlet arranged to introduce a liquid reductant into or onto a structure in the exhaust duct upstream the catalytic NOx converter.

In the inventive device, the structure is a sorption structure having pores configured to retain the liquid reductant in liquid form until it evaporates.

This means that the sorption structure has pores capable of absorbing or adsorbing the reductant when in liquid form and of retaining the reductant onto the sorption structure until it evaporates and gets mixed into the exhaust gas flow. This means also that the pores in question form open cavities or channels that are accessible from a surface of the sorption structure. In addition to the open pores, the sorption structure may or may not comprise closed pores/voids.

With a device according to the invention it is possible to prevent or at least reduce release of (too much) liquid reductant into the exhaust gas, which prevents or reduces the risk of forming deposits etc. at low exhaust gas temperatures. Further, since liquid reductant can be stored in or onto the sorption structure in the exhaust duct, it becomes easier to control the release of reductant. For instance, the liquid reductant stored in the sorption structure will be automatically evaporated and released at a higher rate as the exhaust gas temperature or mass flow increases. Due to the storage effect, there is some time delay until the sorption structure needs to be supplied with more liquid reductant.

This is in clear contrast to most conventional systems where liquid reductant is simply sprayed into the exhaust duct. Besides problems related to depositions etc., it is difficult to design a system for injecting reductant that can react as quickly and correctly to changes in temperature or mass flow of the exhaust gas as the stored liquid reductant in the sorption structure. The invention is also in clear contrast to e.g. US2007/0036694 where the main purpose is to disperse the liquid reductant properly in the exhaust gas, and where there is no sorption structure having pores configured to retain the liquid reductant in liquid form until it evaporates (but only plates provided with holes that are too large for adsorbing or absorbing any liquid reductant).

Moreover, the inventive device enables an efficient evaporation of the liquid reductant since an efficient heat transfer can be used, i.e. heat transfer from the sorption structure, which is heated by the exhaust gas, directly to the liquid reductant. Heat transfer from a solid structure to a liquid is more efficient than the conventional way of transferring heat from (exhaust) gas to liquid (reductant).

Further, in a traditional system a repulsive force is often present between the liquid reductant and the solid stainless steel surface/mixer due to the so-called Leidenfrost effect. The liquid produces an insulating vapour layer keeping the liquid from boiling rapidly when the liquid comes in contact with a surface with higher temperature than the liquid boiling point, which is ca 100° C. for AdBlue since the water content is 67% (32.5% urea and 67.5% deionized water). An additional advantage of using a sorption structure with a porous material surface is that such a surface influences the surface tension properties between the liquid reductant and the surface so as to more effectively adsorb the liquid reductant and prohibit or at least reduce the Leidenfrost effect.

The invention also makes it possible to provide for enhanced evaporation in low temperature situations by heating the sorption structure, i.e. by providing the sorption structure onto a heating element or integrating a heating element into the sorption structure. The heating element can be heated in a controlled manner by e.g. electricity or exhaust gas heat exchange. Such a heating element can be used to control the temperature of the sorption structure and thus to control the evaporation of the reductant.

Today's light duty vehicles with low fuel consumption generally have low exhaust gas temperatures. For SCR substrates that are commonly used as catalytic NOx converters, the low exhaust gas temperatures limit the possibility to dose liquid reductant in the exhaust gas flow. The present invention is very suitable for such vehicles.

The minimum temperature range in today's traditional vehicle applications where liquid reductant is injected directly into the exhaust gas flow in the exhaust duct is approximately 180-200° C. to secure that the liquid reductant is evaporated in an efficient way. The minimum operation temperature of the SCR catalyst substrate is about 150° C. and there is thus a gap between the operation temperature of the SCR catalyst substrate and the temperature where injection of liquid reductant takes place. If injecting liquid reductant in temperatures below the minimum temperature range of 180-200° C. in traditional vehicle applications, there is a risk of wetting of the walls in the exhaust duct and reduction deposit formation on the walls and other components of the exhaust duct. By using a sorption structure according to the invention, liquid reductant can be introduced into the exhaust duct at lower temperatures compared to traditional applications, such as from about 150° C.

The sorption structure may be regarded as a three-dimensional porous structure that can retain the liquid reductant until evaporation of the liquid reductant into the exhaust gas flow occurs. This is in contrast to the type of structure exemplified in US2007/0036694 which rather is two-dimensional as the length of the holes (i.e. the thickness of the plate) is very small compared to the diameter of the holes.

Preferably, the porous structure has surface properties that improve wetting between the liquid reductant and the surface of the sorption structure to enhance adsorption of liquid reductant.

The sorption structure can be made of any suitable material having pores capable of absorbing or adsorbing liquid reductant provided that it also can withstand the temperature and chemical environment in the exhaust gas. The sorption structure may be made of composite materials, ceramic materials, sintered metal structures, such as sintered steel materials, titanium alloys, titanium dioxides or foamed composite materials. The pore structure of the sorption structure may vary depending on the material used.

In an embodiment of the invention the sorption structure comprises a porous material exhibiting a three-dimensional pore structure.

Various pore diameter/width ranges and distributions may work properly depending on the application. A pore diameter/width of around 5 µm is an example of a suitable pore size.

In an embodiment of the invention the sorption structure comprises a macro-porous structure having pores with a diameter or width of between 50 nm and 100 µm. Generally, pores with a width greater than 50 nm are denoted macropores (Rouquerol, J.; et al. (1994). "Recommendations for the characterization of porous solids" Pure and Appl. Chem. 66: 1739-1758). A macro-porous structure having a pore width range of 50 nm-100 µm has been found to be suitable for the invention. In an embodiment of the invention the macro-porous structure has pores with a diameter or width of between 500 nm and 100 µm.

In an embodiment of the invention the sorption structure comprises a meso- or micro-porous structure having pores with a diameter or width of less than 50 nm. In some applications such small pores are very useful to achieve particular surface effects. A particularly advantageous effect can be achieved in some applications by arranging such a meso- or micro-porous structure onto a macro-porous structure.

It is not necessary that all pores of the sorption structure exhibit a diameter or length within the ranges given; the function of the sorption structure can be effective even if some fraction of the pores is outside a certain range.

In an embodiment of the invention the pores of the sorption structure exhibits a pore opening surface density of at least 10 pore openings per $mm^2$, preferably at least 100 pore openings per $mm^2$. The number of pore openings may even be higher than 1000 openings per $mm^2$, typically depending on the (distribution of the) pore diameter/width. The pore opening surface density corresponds to the number of open pores per area unit at the surface of the surface structure.

Besides pore diameter/width and pore opening surface density, it is likely that the pore volume, both the distribution of individual pore volumes and the total pore volume, has an effect on the performance of the sorption structure. It has been noted that the pore volume typically obtained for sorption structures produced by known methods, such as sintering, works well for the application described here. It should be noted that it is normally difficult both to measure the pore volume in a correct and objective manner as well as to produce a porous solid with an exactly specified pore volume. Although some porosity characteristics can be difficult to control and measure, it should also be noted that porous solids intended to exhibit certain porosity characteristics, i.e. the kind of material of concern in this invention, can be clearly distinguished from other material that are not intended to exhibit any particular porosity, such as a regular steel plate (that, inevitably, exhibits some sort of porosity).

In an embodiment of the invention the sorption structure is a sintered material. Sintering is a suitable method for producing a structure with pores adapted for retaining a liquid reductant.

In an embodiment of the invention the sorption structure is made of stainless steel. In another embodiment the sorption structure is made of metal oxide, preferably $TiO_2$ and/or $ZrO_2$. The sorption structure may be made of a combination of stainless steel and metal oxide, preferably $TiO_2$ and/or $ZrO_2$, wherein the metal oxide preferably forms an outer layer on the stainless steel. For instance, the metal oxide may form a meso- or microporous structure forming an outer layer of a macroporous structure made of stainless steel.

In an embodiment of the invention the sorption structure is arranged on a wall inside the exhaust duct. Alternatively, or as a complement, the sorption structure is arranged inside the exhaust duct in an open configuration where the sorption structure is arranged onto or forms a carrier allowing through-flow of exhaust gas. For instance, the porous sorption structure may be a relatively thin film applied to a wall of the exhaust duct, to a carrier that is arranged in the exhaust duct and that allows through-flow of exhaust gas, or to another part of the system. The porous sorption structure may also form an object with structural strength and may, for instance, form parts of or the entire carrier mentioned above.

In an embodiment of the invention the fluid inlet comprises an injection nozzle configured to spray liquid reductant in a certain spray pattern towards the sorption structure so as to form a corresponding spray target area on an outer side of the sorption structure, wherein the spray target area corresponds to, or is located within, an outer periphery of the sorption structure. This means that the reductant is sprayed directly onto the sorption structure only, and not onto walls or other parts of the device, which increases the chance of sorbing all liquid reductant and reduces the risk of releasing (too much) liquid reductant into the flow of exhaust gas that might lead to wetting of walls etc.

In an embodiment of the invention the fluid inlet is arranged on an inner side of the sorption structure. This means, at least in principle, that reductant in liquid form can be kept on the inside of the sorption structure and that only evaporated reductant leaves the sorption structure at its outside, which is in contact with the exhaust gas flow. In this case a large fraction of the pores are preferably open in both ends and extend through the sorption structure to allow entrance of liquid reductant at their inner opening and allow exit of evaporated reductant at its outer opening.

In an embodiment of the invention the device comprises a controllable heating element arranged in association with the sorption structure so as to allow controllable heating of the sorption structure via the heating element. As mentioned above, this makes it possible to evaporate reductant efficiently also in low-temperature situations.

The invention also relates to a vehicle comprising an exhaust gas aftertreatment device of the above type.

BRIEF DESCRIPTION OF DRAWINGS

The invention will be described in greater detail in the following, with reference to the attached drawings, in which.

DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
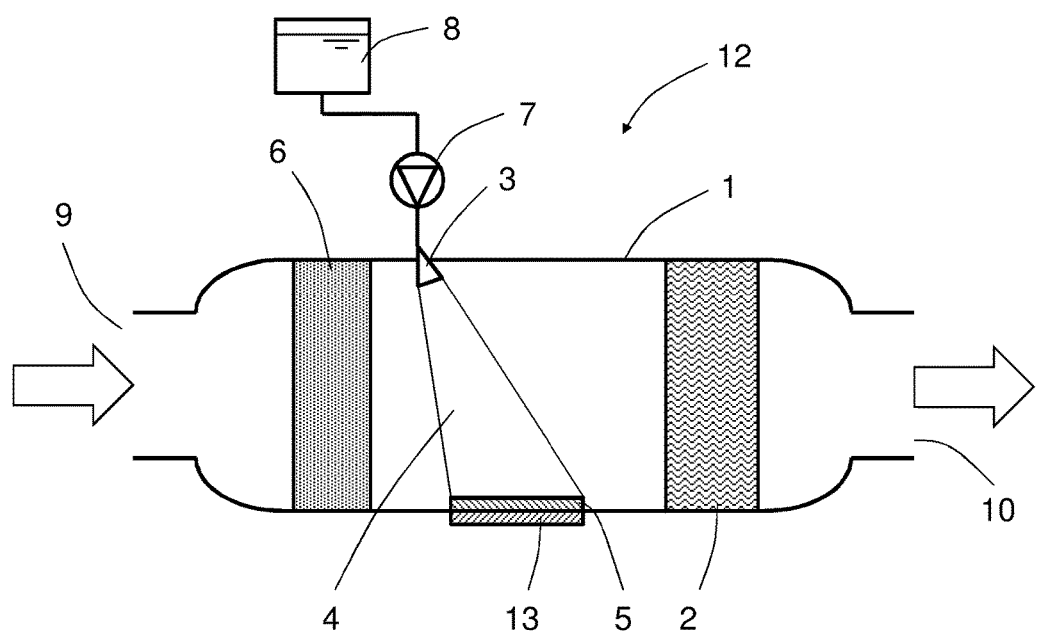
FIG. 1 shows schematically, a first example of an exhaust gas aftertreatment device according to the disclosure.

FIG. 1 schematically shows a first example of an exhaust gas aftertreatment device 12 for an internal combustion engine, typically in a vehicle application, comprising an exhaust duct 1 with a tubular, longitudinal body having an inlet 9 and an outlet 10 for exhaust gas, where the inlet 9 is in fluid communication with the outlet 10. When the internal combustion engine is running, exhaust gas exhausted from the engine passes through the exhaust duct 1 in a flow direction indicated by the arrows in FIG. 1. An oxidation catalyst 6 is located close to the inlet 9. A particle filter may also be provided for removal of particulate matters. Downstream the oxidation catalyst 6, a fluid inlet 3 in the form of a spraying nozzle is arranged for introducing a fluid reductant 4 into the exhaust duct 1.

The fluid reductant 4 is introduced, in this example sprayed, onto a sorption structure 5 arranged, in this example, on a wall of the exhaust duct 1. A catalytic NOx converter 2 is arranged downstream the fluid inlet 3 and the sorption structure 5. The liquid reductant 4 is stored in a tank 8 and pressurized by a pump 7. The pump 7 is controlled so as to adjust the amount of liquid reductant 4 injected so that a proper amount is added to the exhaust gas flow depending on the operation conditions of the engine.

The oxidation catalyst 6 may be of any conventional type used in the automotive industry and the oxidation catalyst substrate may be of any suitable type. The functionality of possible catalytic substrates used as oxidation catalyst substrate is not described herein, since this is considered to be part of common knowledge.

Immediately after being exhausted from the internal combustion engine, the exhaust gas is containing nitrogen oxides (NOx) mainly consisting of nitrogen monoxide (NO). The oxidation catalyst 6 is oxidizing a part of the exhausted NO into nitrogen dioxide ($NO_2$). The liquid reductant 4, such as urea water or aqueous ammonia, is added to the exhaust gas to reduce the NOx contained therein. Urea hydrolyses and forms ammonia ($NH_3$).

NOx is reduced in the catalytic NOx converter 2 to nitrogen and water by using the ammonia added or produced. The reaction to reduce NOx to nitrogen and water is most rapidly progressed at a molar ratio of 1:1 between NO and NO2 in relatively low exhaust gas temperatures and therefore the oxidation catalyst 6 may control the oxidation process to achieve this molar ratio in order to promote the reaction of harmful NOx. With the molar ratio of 1:1 between NO and $NO_2$, NOx is reduced by ammonia according to the formula:

$$NO+NO_2+2NH_3 \rightarrow 2N_2+3H_2O$$

If the reaction between NOx and ammonia is carried out in a non-ideal way, non-reacted harmful ammonia may come out of the catalytic NOx converter 2 and therefore a further catalyst for treating ammonia may be provided downstream the catalytic NOx converter 2.

The catalytic NOx converter 2 may be a traditional catalytic NOx converter commonly used for reduction of NOx in internal combustion engine applications, such as a substrate with SCR functionality. The functionality of possible catalytic substrates used as catalytic NOx converter substrate are not described herein, since this is considered to be part of common knowledge.

The liquid reductant 4 sprayed onto the sorption structure 5 sorbs in liquid form in the pores of the sorption structure 5. Some fraction of the reductant 4 might evaporate directly when injected into the exhaust duct 1, and some fraction might be dispersed in liquid form in the exhaust gas, which is acceptable. The liquid reductant 4 adsorbed onto/into the sorption structure 5 is evaporated by the heat transferred from the sorption structure 5, which in turn has been and is heated by the exhaust gas. The release rate of evaporated reductant from the sorption structure 5 depends on the conditions of the exhaust gas (temperature, mass flow, flow pattern) and the sorption structure (temperature, amount of liquid reductant stored in the sorption structure), and of the properties of the particular sorption structure 5 used (pore size, total pore volume, etc.).

The addition of liquid reductant 4 is adapted to the particular sorption structure used (besides to the operation conditions of the combustion engine).

The fluid inlet 3 can be located in any suitable position within the exhaust duct 1 and extends through the wall of the exhaust duct 1. The fluid inlet 3 is in this example an injection nozzle that produces a spray of small droplets of liquid reductant 4 that are introduced into or onto the sorption structure 5.

The nozzle 3 is arranged so that the injection of liquid reductant 4 is taking place in a predetermined spraying pattern (as indicated in the figure). The liquid reductant 4 is through the spraying pattern controlled to match the surface shape of the sorption structure 5 to secure that liquid reductant 4 is not introduced on parts of the exhaust duct outside the sorption structure 5. In other words, the injection nozzle 3 is configured to spray liquid reductant 4 in a certain spray pattern towards the sorption structure 5 so as to form a corresponding spray target area on an outer side of the sorption structure 5, wherein the spray target area corresponds to, or is located within, an outer periphery of the sorption structure 5. The spraying pattern may be in any shape suitable for the application, for instance square, rectangular, circular, oval, triangular or any other regular or irregular shape.

When the liquid reductant 4 evaporates it is mixed with the exhaust gas flow. The mixing of evaporated reductant and exhaust gas may be improved by arranging a mixer device in the exhaust duct downstream the sorption structure 5 so that the resulting gas flow reaching the catalytic NOx converter 2 is thoroughly mixed, which improves the reduction of NOx in the catalytic NOx converter 2.

The sorption structure 5 is heated by the exhaust gas flow and through the heat stored in the sorption structure 5 enough power for a controlled evaporation of liquid reductant 4 is normally achieved through heat transferred from the exhaust gas via the sorption structure 5 to the liquid reductant 4.

A controllable and in this case electrical heating element 13 is provided in close connection to the sorption structure 5 so as to be capable of transferring additional heat to the sorption structure 5. The heating element 13 is used as an additional heat source when the sorption structure 5 has a too low temperature for evaporating liquid reductant 4 at a sufficient rate.

There is also a possibility to arrange two or more sorption structures 5 with corresponding fluid inlets 3 in different locations in the exhaust duct 1, depending on the design of the exhaust gas aftertreatment device 12.

FIGS. 2-6 show further examples of an exhaust aftertreatment device 12 for an internal combustion engine according to the invention. What is said above in relation to the example shown in FIG. 1 is generally applicable also to the examples shown in FIGS. 2-6, for instance the exhaust duct 1 has a similar inlet 9 and outlet 10, the catalytic converters 2,6 can be of similar type, the pump 7 and tank 8 are similar, mixing is applicable, a heating element 13 for heating the sorption structure 5 may be used, the nozzle 3 and spray pattern are in most cases principally similar, etc. The reference signs used in FIG. 1 are used also for the corresponding components in FIGS. 2-6. The focus below is set on the differences compared to the example shown in FIG. 1.

Figure 2:
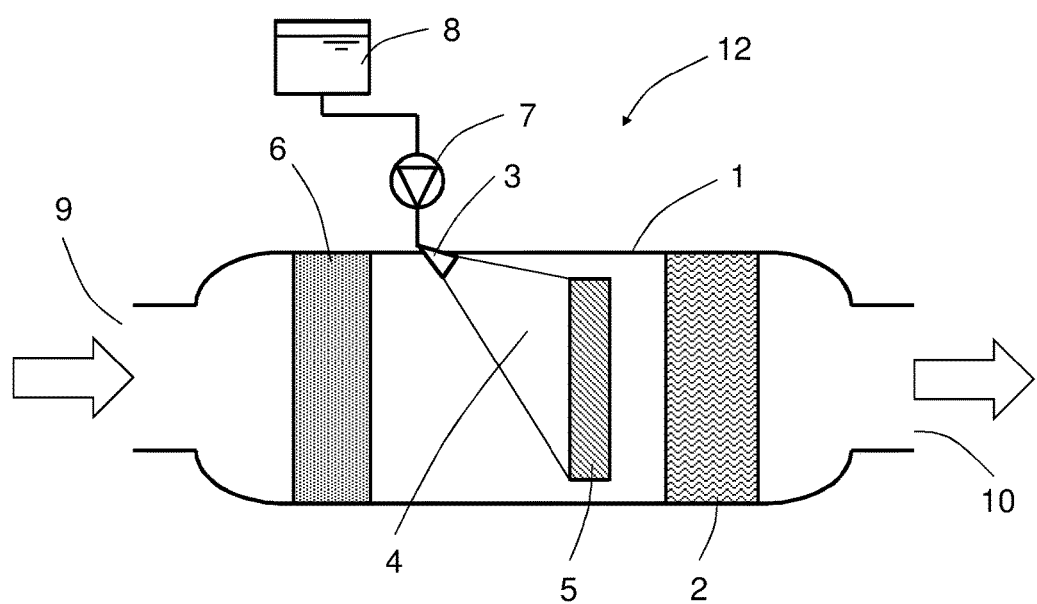
FIG. 2 shows schematically, a second example of an exhaust gas aftertreatment device according to the disclosure.

FIG. 2 schematically shows a second example of an exhaust aftertreatment device 12 for an internal combustion engine. In this embodiment the sorption structure 5 is arranged inside the exhaust duct 1 in an open configuration where the sorption structure 5 also forms a carrier structure provided with larger channels allowing through-flow of exhaust gas. Alternatively, the sorption structure 5 may be applied onto a carrier structure made of another material. This arrangement provides for a large contact surface between the sorption structure 5 and the exhaust gas flow, which in turn provides for an efficient evaporation of liquid reductant 4.

Figure 3:
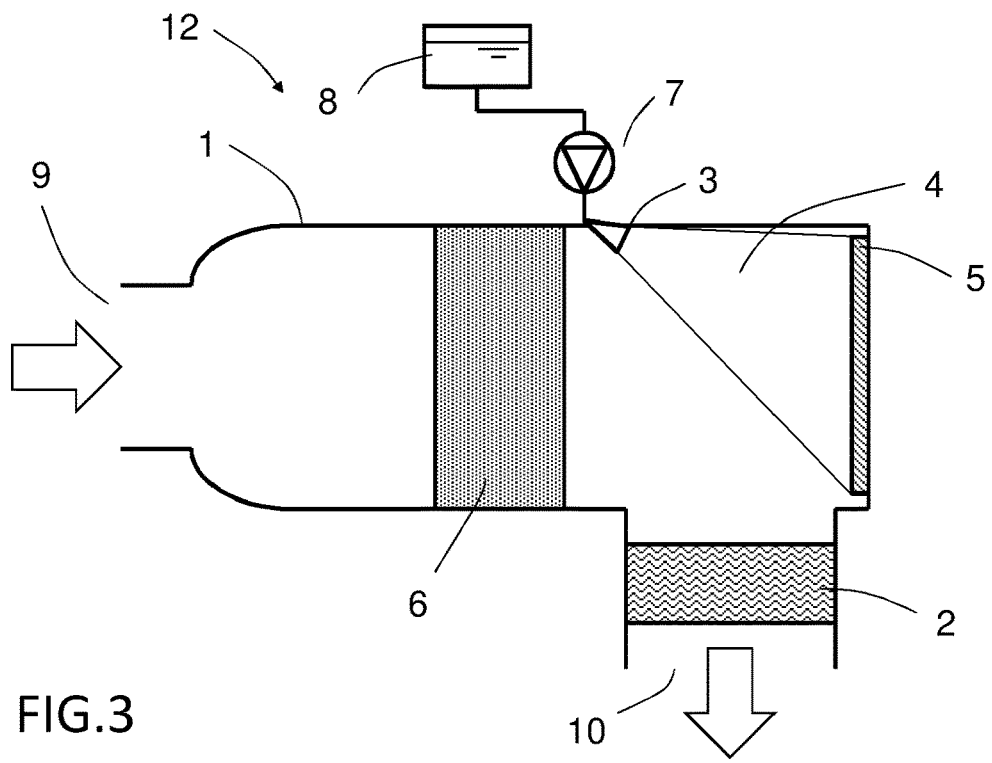
FIG. 3 shows schematically, a third example of an angled exhaust gas aftertreatment device according to the disclosure.

FIG. 3 schematically shows a third example of an exhaust aftertreatment device 12 for an internal combustion engine, wherein the exhaust duct 1 forms an angled body. The angled configuration provides a more compact design of the exhaust gas aftertreatment device 12.

In this embodiment, the sorption structure 5 is arranged on the wall surface of the exhaust duct at an end of a first straight part of the exhaust duct 1, at an outer wall at a knee of the exhaust duct. The sorption structure 5 is in this example in the form of a layer or coating on the wall. The sorption structure 5 is in this embodiment well exposed to the flow of exhaust gas which provides for efficient heat transfer and reductant evaporation. Further, the injection of liquid reductant 4 is simplified since it can be made in the direction of the exhaust gas flow.

Figure 4:
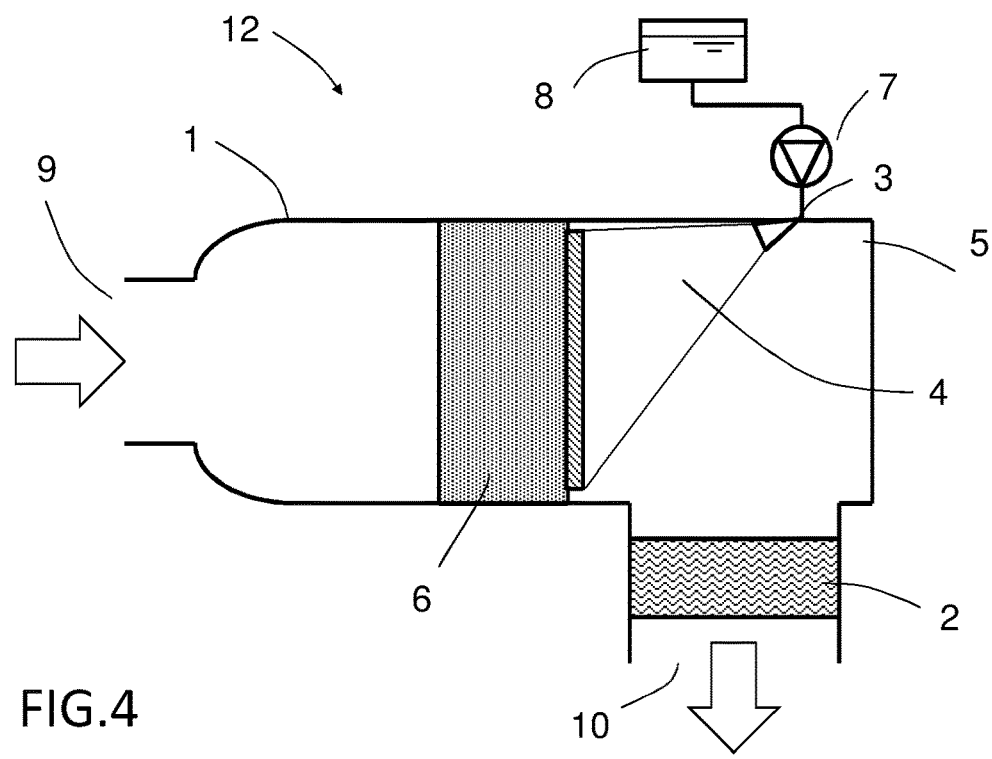
FIG. 4 shows schematically, a fourth example of an angled exhaust gas aftertreatment device according to the disclosure.

FIG. 4 schematically shows a fourth example of an exhaust aftertreatment device 12 for an internal combustion engine, where the exhaust duct 1 forms an angled body similar to FIG. 3. In this embodiment, the sorption structure 5 is arranged on the oxidation catalyst 6. A part or all of the downstream side of the oxidation catalyst 6 is coated with a layer of sorption structure 5. Alternatively, the sorption structure 5 may form or be arranged onto a separate carrier structure (that allows exhaust gas through flow as described above) together with the oxidation catalyst 6. Also in this embodiment, the sorption structure 5 is well exposed to the flow of exhaust gas which provides for efficient heat transfer and reductant evaporation.

The sorption structure 5 may be arranged on the oxidation catalyst 6 in line with FIG. 4 also in an exhaust duct not having an angular configuration.

Figure 5:
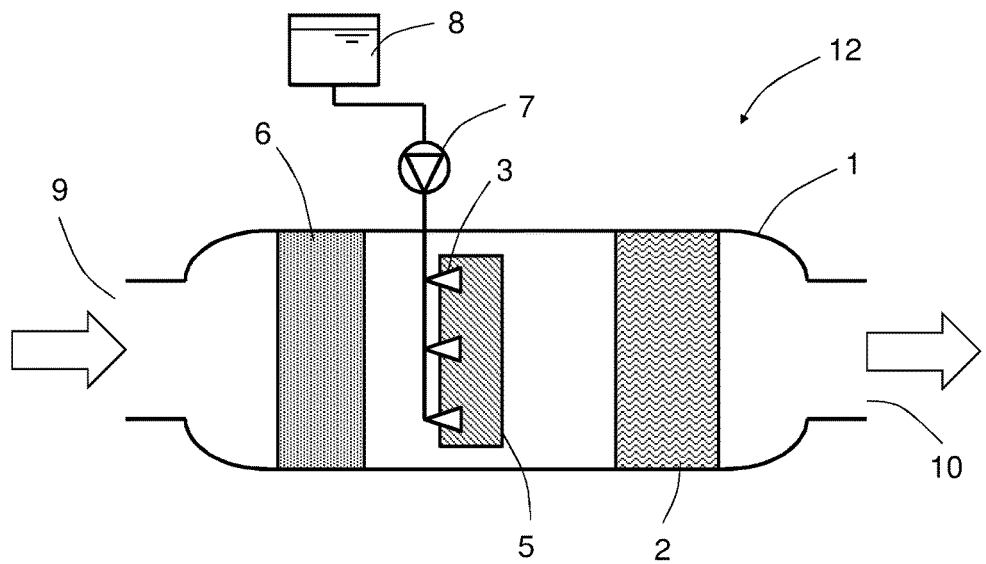
FIG. 5 shows schematically, a fifth example of an exhaust gas aftertreatment device according to the disclosure.

FIG. 5 schematically shows a fifth example of an exhaust aftertreatment device 12 for an internal combustion engine. In this embodiment the sorption structure 5 is arranged inside the exhaust duct 1 in an open configuration forming or being arranged onto a carrier structure allowing exhaust gas through-flow similar to what has been described in relation to FIG. 2.

In the example shown in FIG. 5, the fluid inlet 3, which in this example comprises three parallel inlets, is arranged on an inner side of the sorption structure 5. The liquid reductant is thus supplied to the sorption structure 5 from an inside, i.e. via the carrier structure, and the liquid reductant 4 is introduced into, rather than onto, the sorption structure 5 without first passing the flow of exhaust gas. In this way, particularly efficient and controlled dosing and evaporation of liquid reductant 4 can be achieved. The reductant is in this example transported out to the exhaust duct 1 via the pores of the sorption structure 5, which pores in this case have openings both at the inner side of the sorption structure, where the liquid reductant is supplied, and at the outer side of the sorption structure, which is in contact with the exhaust gas flow. Various possibilities exist for arranging the fluid inlets 3 and the transport of liquid reductant to the sorption structure. For instance, additional channel or larger pores may be arranged in the carrier structure to transport liquid reductant from the inlets 3 to the outer porous parts of the sorption structure.

Such direct introduction of liquid reductant to the sorption structure, i.e. without spraying the reductant onto the outer side of the sorption structure, is also possible when the sorption structure 5 is applied to e.g. a wall of the exhaust duct 1, for instance in the form of a layer attached onto a wall as exemplified in FIGS. 1 and 3. The reductant can be supplied to the inner side, the backside, of such a layer directly via openings in the wall behind the sorption structure. The sorption structure may in such a case be arranged onto a support plate specifically adapted to transport and distribute the liquid reductant supplied from one or several fluid inlets arranged at the openings of the wall of the exhaust duct 1. In such a case the fluid inlet or inlets may formally be regarded to be located at the interface between the support plate and the sorption structure.

Figure 6:
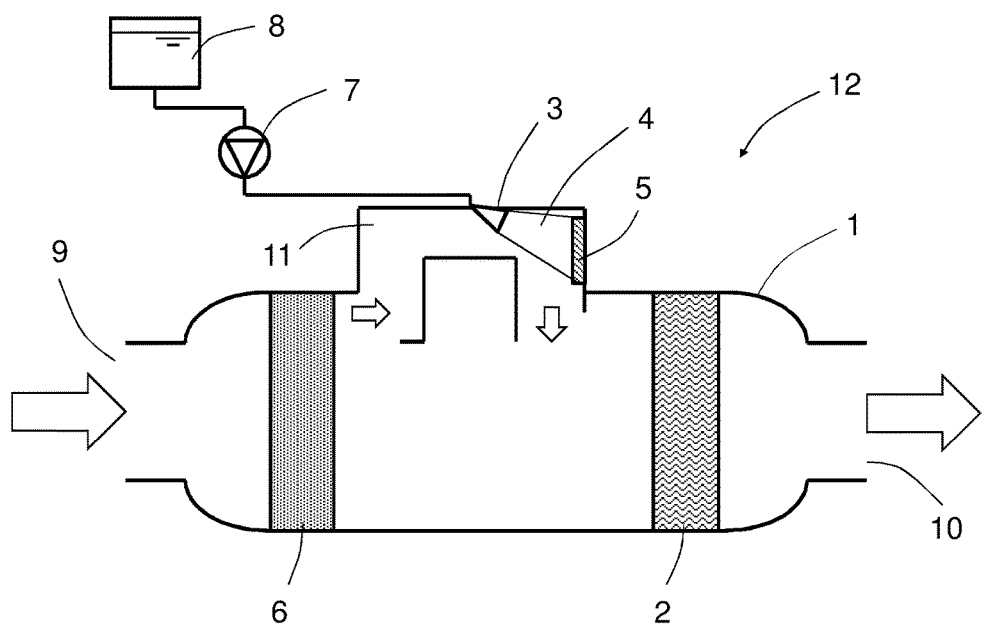
FIG. 6 shows schematically, a sixth example of an exhaust gas aftertreatment device according to the disclosure.

FIG. 6 schematically shows a sixth example of an exhaust aftertreatment device 12. In this embodiment a part of the exhaust gas flow is directed into a bypass duct 11 that is in fluid communication with the exhaust duct 1. The part of the exhaust gas flow that is directed into the bypass duct 11 is used for evaporating the liquid reductant 4 retained in the sorption structure 5. The sorption structure 5 is arranged on a wall surface of the bypass duct 11, for example through a layer or coating of sorption structure 5. The fluid inlet 3 extends through the wall of the bypass duct 11.

Alternatively, the sorption structure 5 may be arranged inside the bypass duct 11 in an open configuration corresponding to what has been described above.

The bypass duct 11 may be much more separated from the exhaust duct 1 than indicated in FIG. 6. Further, as the temperature of the exhaust gas generally is higher upstream than downstream, it may be advantageous to position the sorption structure 5 in the beginning of the bypass duct 11, i.e. in the upstream part of the bypass duct 11.

Also in the case where the sorption structure 5 is located in a bypass duct 11, it is possible to make use of the direct introduction of liquid reductant into the sorption structure 5 as described in relation to FIG. 5.

The exhaust gas aftertreatment device 12 is typically to be used in a vehicle provided with a control unit, which is adapted to control the exhaust aftertreatment device 12. The control unit is connected to the control system of the vehicle, which for example controls the injection of liquid reductant 4 and the power supply to the heating element 13.

REFERENCE SIGNS

1: Exhaust duct
2: Catalytic NOx converter
3: Fluid inlet (for liquid reductant)
4: Liquid reductant (spray pattern)
5: Sorption structure
6: Oxidation catalyst
7: Pump
8: Tank
9: Exhaust gas inlet
10: Exhaust gas outlet
11: Bypass duct
12: Exhaust gas aftertreatment device
13: Heating element

The invention claimed is:

1. An exhaust gas aftertreatment device for an internal combustion engine, comprising:
    an exhaust duct allowing a through-flow of exhaust gas;
    a catalytic NOx converter arranged in the exhaust duct;
    a fluid inlet arranged to introduce a liquid reductant into or onto a structure in the exhaust duct upstream of the catalytic NOx converter;
    wherein the structure is a sorption structure having pores configured to retain the liquid reductant in liquid form until it evaporates,
    wherein the sorption structure comprises a macro-porous structure having pores with a diameter or a width of between 50 nm and 100 µm, and
    wherein the macro-porous structure has a pore opening surface density of at least 10 pore openings per $mm^2$.

2. An exhaust gas aftertreatment device according to claim 1, wherein the sorption structure comprises a porous material exhibiting a three-dimensional pore structure.

3. An exhaust gas aftertreatment device according to claim 1, wherein the macro-porous structure has pores with a diameter or width of between 500 nm and 100 µm.

4. An exhaust gas aftertreatment device according to claim 1, wherein the sorption structure is a sintered material.

5. An exhaust gas aftertreatment device according to claim 1, wherein the sorption structure is made of stainless steel.

6. An exhaust gas aftertreatment device according to claim 1, wherein the sorption structure is made of metal oxide.

7. An exhaust gas aftertreatment device according to claim 1, wherein the sorption structure is arranged inside the exhaust duct on a wall thereof or in an open configuration where the sorption structure is arranged onto or forms a carrier allowing through-flow of exhaust gas.

8. An exhaust gas aftertreatment device according to claim 1, wherein the sorption structure is arranged in an exhaust gas bypass duct that is in fluid communication with the exhaust duct.

9. An exhaust gas aftertreatment device according to claim 1, wherein the fluid inlet comprises an injection nozzle configured to spray liquid reductant in a certain spray pattern towards the sorption structure so as to form a corresponding spray target area on an outer side of the sorption structure, wherein the spray target area corresponds to, or is located within, an outer periphery of the sorption structure.

10. An exhaust gas aftertreatment device according to claim 1, wherein the fluid inlet is arranged on an inner side of the sorption structure.

11. An exhaust gas aftertreatment device according to claim 1, wherein the device comprises a controllable heating element arranged in association with the sorption structure so as to allow controllable heating of the sorption structure via the heating element.

12. A vehicle comprising an exhaust gas aftertreatment device according to claim 1.

\* \* \* \* \*